(12) United States Patent
Scriber et al.

(10) Patent No.: US 11,281,779 B2
(45) Date of Patent: Mar. 22, 2022

(54) SYSTEMS AND METHODS FOR PRIVACY MANAGEMENT USING A DIGITAL LEDGER

(71) Applicant: CABLE TELEVISION LABORATORIES, INC, Louisville, CO (US)

(72) Inventors: Brian A. Scriber, Denver, CO (US); Steven J. Goeringer, Westminster, CO (US); Zane Hintzman, Broomfield, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 16/264,406

(22) Filed: Jan. 31, 2019

(65) Prior Publication Data

US 2019/0236286 A1 Aug. 1, 2019

Related U.S. Application Data

(60) Provisional application No. 62/624,519, filed on Jan. 31, 2018.

(51) Int. Cl.
| | |
|---|---|
| *G06F 21/60* | (2013.01) |
| *H04L 9/30* | (2006.01) |
| *G06F 16/27* | (2019.01) |
| *G06F 21/62* | (2013.01) |
| *H04L 9/08* | (2006.01) |

(Continued)

(52) U.S. Cl.
CPC ............ *G06F 21/602* (2013.01); *G06F 16/27* (2019.01); *G06F 21/33* (2013.01); *G06F 21/6245* (2013.01); *H04L 9/0825* (2013.01); *H04L 9/30* (2013.01); *H04L 9/3239* (2013.01); *H04L 63/0435* (2013.01); *H04L 63/0442* (2013.01);

(Continued)

(58) Field of Classification Search
CPC ........ G06F 21/602; G06F 16/27; G06F 21/33; G06F 21/6245; H04L 9/0825; H04L 63/0435; H04L 63/0442; H04L 63/0823
See application file for complete search history.

(56) References Cited

U.S. PATENT DOCUMENTS 6,820,204 B1 * 11/2004 Desai .................. G06F 21/6245
726/6
6,983,377 B1 * 1/2006 Beesley .................. G06F 21/31
709/229

(Continued)

OTHER PUBLICATIONS

International Search Report and Written Opinion for related Application No. PCT/US2019/016177, dated Mar. 25, 2019, 14 pages.

*Primary Examiner* — Tongoc Tran
(74) *Attorney, Agent, or Firm* — Armstrong Teasdale LLP

(57) ABSTRACT

A system for securely storing privacy information is provided. The system includes a plurality of nodes configured to maintain a distributed database containing consumer privacy information having a plurality of entries. Each entry of the plurality of entries in the distributed database is (i) encrypted with a unique encryption key associated with a consumer and the distributed database, and (ii) indexed based on a public encryption key associated with the consumer. A most recent entry associated with the consumer includes current personal information about the consumer. A first entry associated with the consumer includes an encrypted version of the unique encryption key.

37 Claims, 8 Drawing Sheets

(51) Int. Cl.
*H04L 29/06* (2006.01)
*H04L 9/32* (2006.01)
*G06F 21/33* (2013.01)

(52) U.S. Cl.
CPC ...... *H04L 63/0823* (2013.01); *H04L 2209/38* (2013.01)

(56) References Cited

U.S. PATENT DOCUMENTS

| | | | | |
|---|---|---|---|---|
| 7,076,558 | B1 * | 7/2006 | Dunn | G06F 21/6218 709/225 |
| 7,359,517 | B1 * | 4/2008 | Rowe | G06F 21/6218 380/284 |
| 7,469,341 | B2 * | 12/2008 | Edgett | G06F 21/31 705/75 |
| 8,065,713 | B1 * | 11/2011 | Vainstein | H04L 63/102 713/168 |
| 8,543,649 | B2 * | 9/2013 | Gilmour | G06F 21/6245 709/206 |
| 9,460,421 | B2 * | 10/2016 | Lai | G06F 21/335 |
| 9,892,265 | B1 * | 2/2018 | Tripathy | G06F 21/602 |
| 10,291,395 | B1 * | 5/2019 | Nenov | H04L 9/0894 |
| 2006/0126836 | A1 * | 6/2006 | Rivas | H04L 9/0891 380/47 |
| 2007/0174362 | A1 * | 7/2007 | Pham | G06F 21/6209 |
| 2007/0250700 | A1 | 10/2007 | Sidhu et al. | |
| 2008/0155267 | A1 * | 6/2008 | Lieber | H04L 63/061 713/183 |
| 2012/0291124 | A1 * | 11/2012 | Maria | H04L 63/08 726/22 |
| 2013/0179677 | A1 * | 7/2013 | Harada | G06Q 20/206 713/150 |
| 2014/0006346 | A1 * | 1/2014 | Davis | G06F 9/4451 707/613 |
| 2014/0075181 | A1 * | 3/2014 | Raghupathy | H04L 63/0442 713/150 |
| 2015/0113279 | A1 * | 4/2015 | Andersen | H04L 63/0457 713/171 |
| 2017/0006064 | A1 * | 1/2017 | Agarwal | H04L 9/3263 |
| 2017/0099267 | A1 * | 4/2017 | Heit | H04L 63/0435 |
| 2017/0126644 | A1 | 5/2017 | Ullrich et al. | |
| 2017/0206523 | A1 | 7/2017 | Goeringer et al. | |
| 2017/0352031 | A1 * | 12/2017 | Collin | H04L 9/3239 |
| 2018/0248699 | A1 * | 8/2018 | Andrade | H04L 9/3239 |
| 2018/0343120 | A1 * | 11/2018 | Andrade | H04L 9/3231 |
| 2018/0349968 | A1 * | 12/2018 | O'Brien | H04L 9/3297 |
| 2019/0012666 | A1 * | 1/2019 | Krauss | H04L 9/3236 |
| 2019/0034936 | A1 * | 1/2019 | Nolan | G06Q 20/42 |
| 2019/0035018 | A1 * | 1/2019 | Nolan | H04L 9/0637 |
| 2019/0081800 | A1 * | 3/2019 | Uhr | H04L 63/0823 |
| 2019/0102850 | A1 * | 4/2019 | Wheeler | G06Q 20/102 |
| 2019/0138716 | A1 * | 5/2019 | Huang | H04L 63/20 |
| 2019/0164156 | A1 * | 5/2019 | Lindemann | H04L 9/0894 |
| 2019/0320210 | A1 * | 10/2019 | Ilhan | H04N 21/234309 |
| 2019/0349733 | A1 * | 11/2019 | Nolan | G06F 16/1824 |
| 2019/0386829 | A1 * | 12/2019 | Karame | G06F 11/1451 |
| 2020/0050414 | A1 * | 2/2020 | Ilhan | G09G 3/2096 |

* cited by examiner

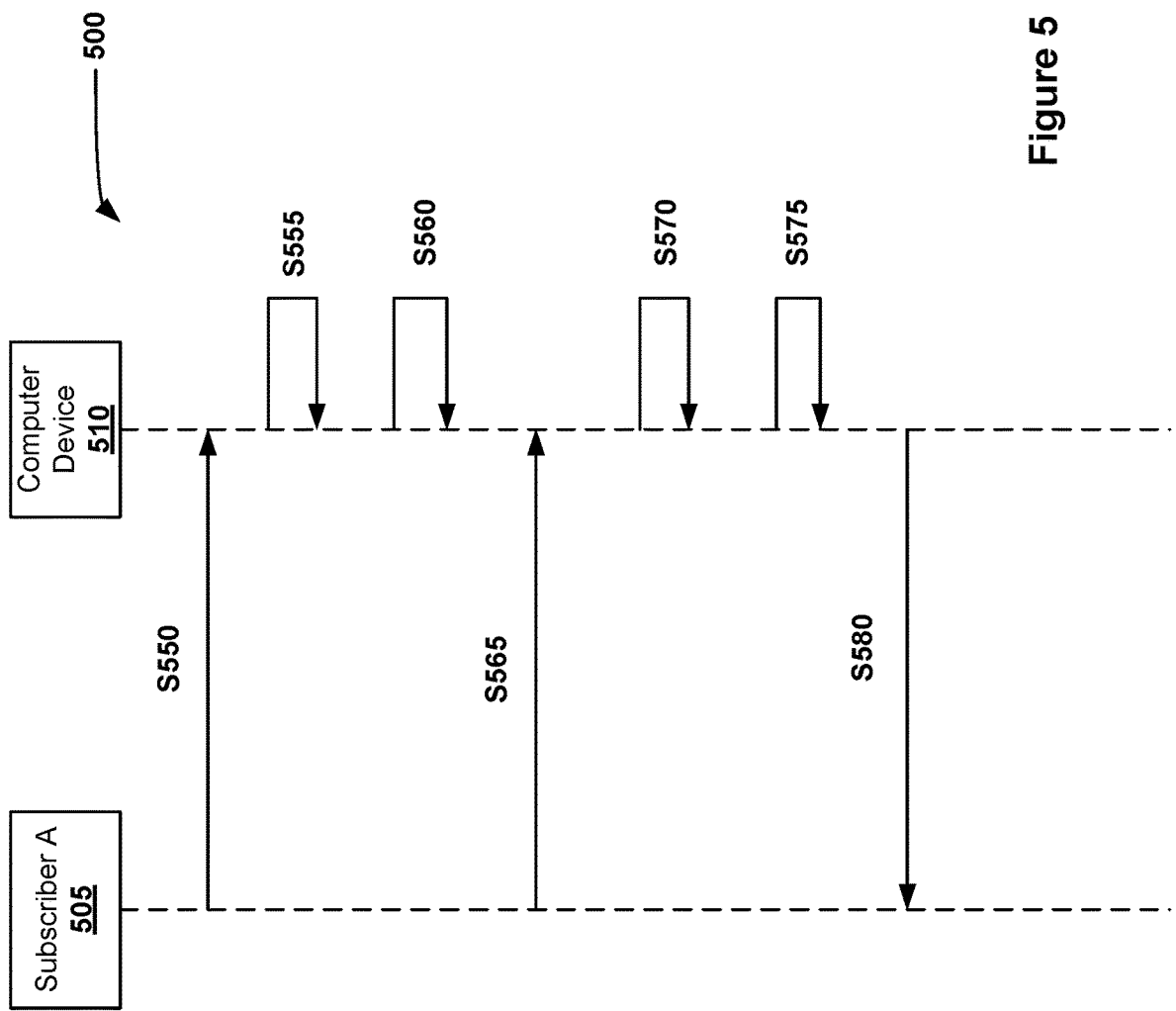

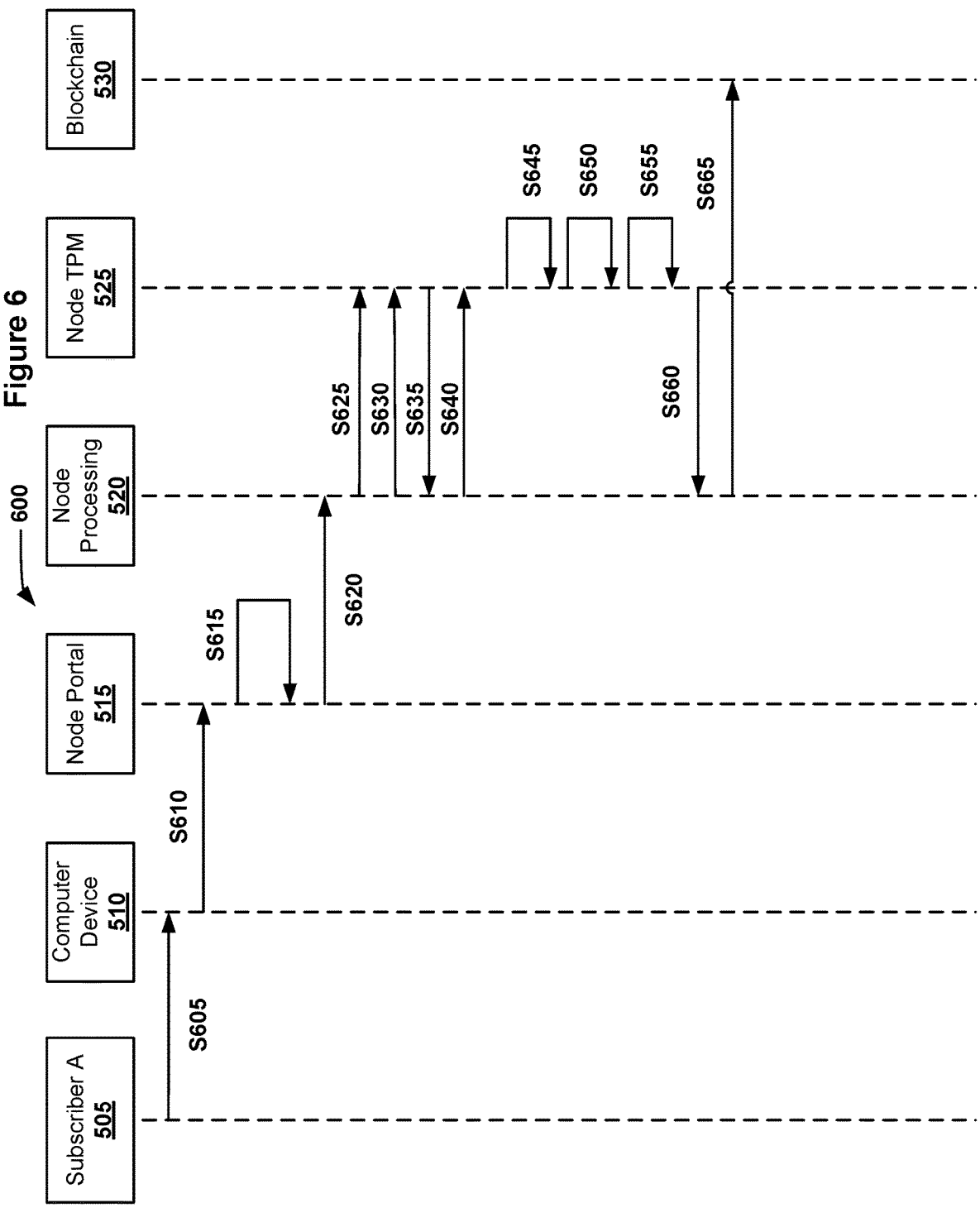

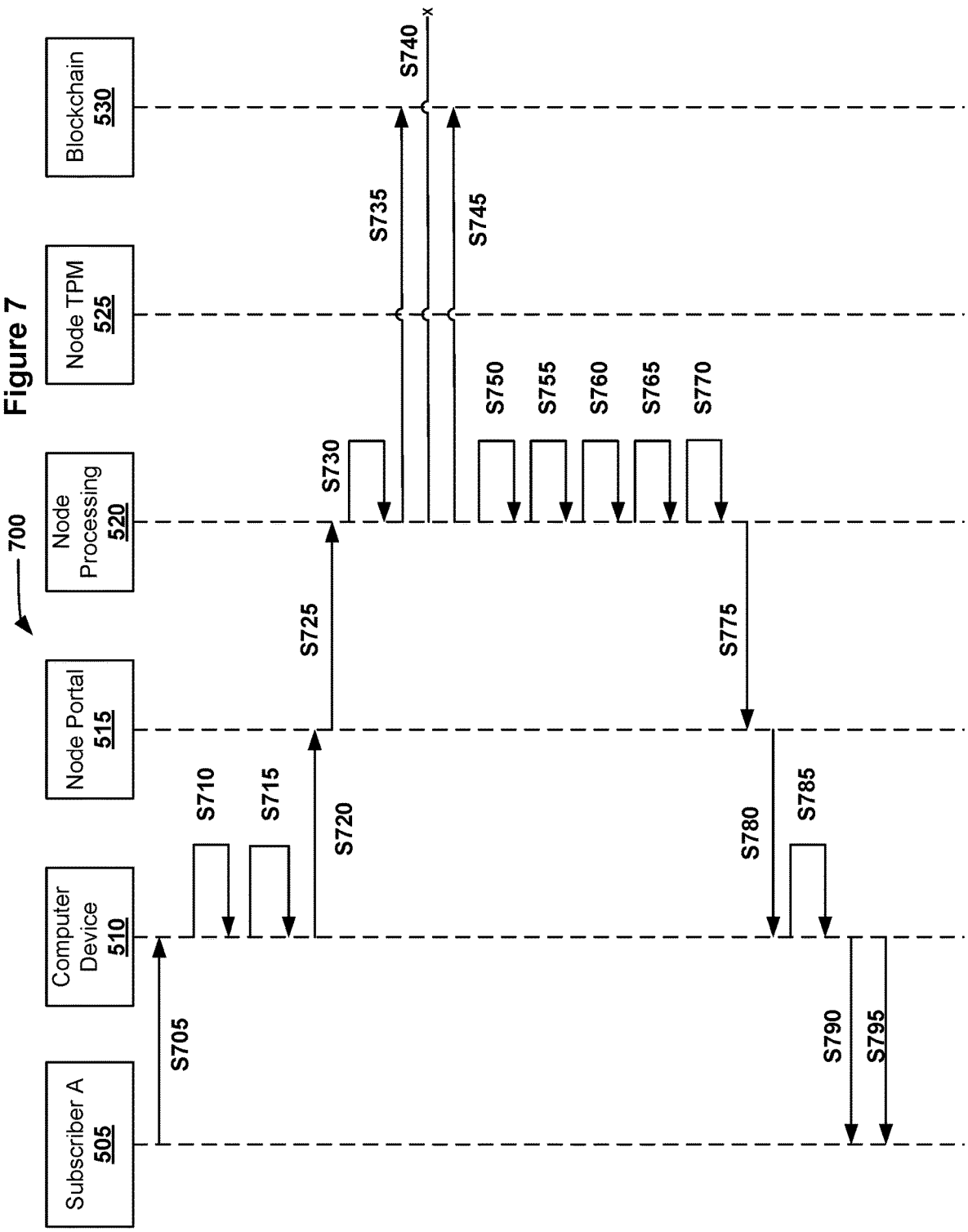

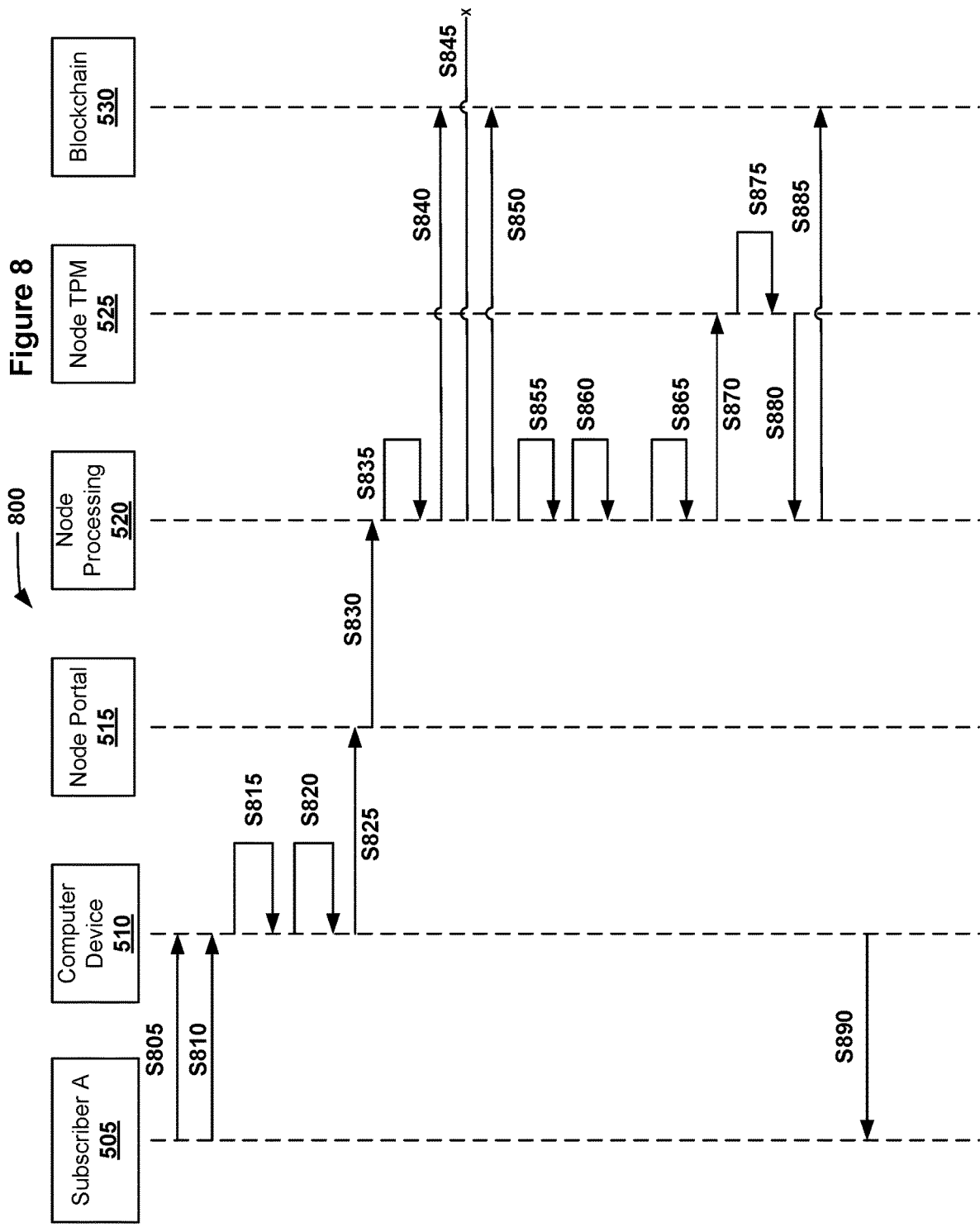

SYSTEMS AND METHODS FOR PRIVACY MANAGEMENT USING A DIGITAL LEDGER

CROSS REFERENCE TO RELATED APPLICATIONS

This application claims the benefit of and priority to U.S. Provisional Patent Application No. 62/624,519, filed Jan. 31, 2018, entitled "NEGOTIATED OPEN PRIVACY EXERCISE AND ENABLEMENT KERNEL [PRIVACY BLOCKCHAIN]," the entire contents and disclosure of which is incorporated by reference in its entirety.

BACKGROUND

The field of the disclosure relates to privacy transaction management systems, and more particularly, to systems and methods for authenticating, auditing, and logging privacy transactions using digital ledger technology.

Through both government action and consumer demand, personal privacy choices are becoming a key gateway to the large amounts of personal information that high technology companies collect about consumers and their devices. Conventional consumer data-use choices (e.g., opt-in/out) are often collected, stored, and removed internally by individual companies, resulting in a fragmented and opaque environment for consumers.

Many conventional electronic devices utilize a Public Key Infrastructure (PKI) to validate an electronic signature of the device in a variety of technology fields, such as telecommunications (e.g., mobile communication devices), the Internet of Things (IoT), online banking, secure email, and e-commerce. Such conventional IoT devices may be deployed in more than one existing ecosystem (e.g., Open Connectivity Foundation (OCF), AllSeen/AllJoyn, Nest/Thread, Zigbee, etc.), and a different key may be inserted on the devices for each ecosystem into which deployment is desired.

PKI uses a pair of cryptographic keys (e.g., one public and one private) to encrypt and decrypt data. PKI utilization enables, for example, devices to obtain and renew X.509 certificates, which are used to establish trust between devices and encrypt communications using such protocols as Transport Layer Security (TLS), etc. A PKI includes policies and procedures for encrypting public keys, as well as the creation, management, distribution, usage, storage, and revocation of digital certificates. The PKI binds the public keys to the identity of a person or legal entity, typically through a trusted Certificate Authority (CA). The PKI hierarchy identifies a chain of trust for a device or program, and further may provide secure software download requirements for the devices, and/or secure certificate injection requirements on the device manufacturers. The CA, the electronic devices, and users of the device interact over a PKI ecosystem.

Many conventional PKI mechanisms depend on Domain Name System Security Extensions (DNSSEC) for specific use cases. These conventional mechanisms do not allow bootstrapping, nor do they enable the building of a trusted set of Root CAs using consensus, which can be cryptographically verified on a digital or distributed ledger, such as a blockchain, for example. As with of the overall conventional PKI ecosystems, above, these conventional PKI mechanisms also suffer from being required to set up one or more trusted Root CAs, thereby further rendering it difficult to implement PKI in many ecosystems. Accordingly, it is desirable to have a PKI mechanism that may be implemented in a PKI ecosystem or subsystem without requiring the a priori setup of one or more Root CAs.

A large amount of transactions performed over a network are not considered to be secure, and conventional transaction security solutions can be extremely complex. Moreover, conventional mechanisms for transaction security that may be considered secure at the present are likely to be considered less secure in the future as new exploitation techniques are discovered. When one security for a transaction has been breached, it can be especially difficult to prove that the transaction itself was compromised, or when the compromise occurred.

Conventional blockchaining technology takes transaction information, encapsulates the information in a digital envelope or "block" and then the block is cryptographically added (using cipher chaining techniques) to the end of a chain of other transactions. This cryptographic addition incorporates information from prior blocks on the chain to calculate the digital chain or "hash" for this new block. The calculations for cryptographic addition can vary widely in complexity based on the rules of the blockchain. This complexity is purposeful though, in order to prevent modification of the existing blockchain to which is being added. That is, in order to modify an earlier block in the chain, the entire chain from that point forward would need to be recalculated. It is through this technique that the immutability of the chain, and permanency of its public ledger, is maintained.

The blockchain is a core component of, for example, the digital currency known as "bitcoin" (generally, a form of "crypto-currency"), where the blockchain serves the public ledger for all transactions. Bitcoin transactions allow every compatible client to connect to a network, send transactions to the network, verify the transactions, and compete to create blocks of the blockchain. The bitcoin transaction, however, involves only the exchange of currency between client and the network. Bitcoin transactions do not involve transactions and negotiations between two individual clients directly, and bitcoin clients do not transfer content beyond the currency value itself. Customers and users of different transactional content that is not exclusively financial, on the other hand, are increasingly sharing access to media services between each other.

The General Data Protection Regulation (GDPR) went into effect May 25, 2018. One of the GDPR provisions requires advertisers to track opting in and out at different levels, at different times, and in different locales. Enforcement agencies, however, have indicated a lack of trust for a network operator's own database that tracks consumer opt-in choices. Furthermore, the penalties for violations of such GDPR provisions can be up to 4% of global revenues. Additionally, many companies require that the individual consumer must provide the consumer's own opt-in/opt-out choice(s) directly to the company itself, which generally requires that the consumer spends significant amounts of time responding, or finding where to respond, to opt-in/out requests. Accordingly, there is a need for systems to independently and centrally track the opt-in and opt-out of consumers.

SUMMARY

In an embodiment, a system for securely storing privacy information is provided. The system includes a plurality of nodes configured to maintain a distributed database containing consumer privacy information having a plurality of entries. Each entry of the plurality of entries in the distributed database is (i) encrypted with a unique encryption key associated with a consumer and the distributed database, and (ii) indexed based on a public encryption key associated with the consumer. A most recent entry associated with the consumer includes current personal information about the consumer. A first entry associated with the consumer includes an encrypted version of the unique encryption key.

BRIEF DESCRIPTION OF THE DRAWINGS

These and other features, aspects, and advantages of the present disclosure will become better understood when the following detailed description is read with reference to the following accompanying drawings, in which like characters represent like parts throughout the drawings.

FIG. 5 is data flow diagram of a process of a subscriber pre-registering to use the privacy transaction management system shown in FIG. 1.

FIG. 6 is a data flow diagram of a process of the subscriber registering with the blockchain using the privacy transaction management system shown in FIG. 1.

FIG. 7 is a data flow diagram of a process of the subscriber retrieving information from the blockchain using the privacy transaction management system shown in FIG. 1.

FIG. 8 is a data flow diagram of a process of the subscriber appending data to the blockchain using the privacy transaction management system shown in FIG. 1.

Figure 1:
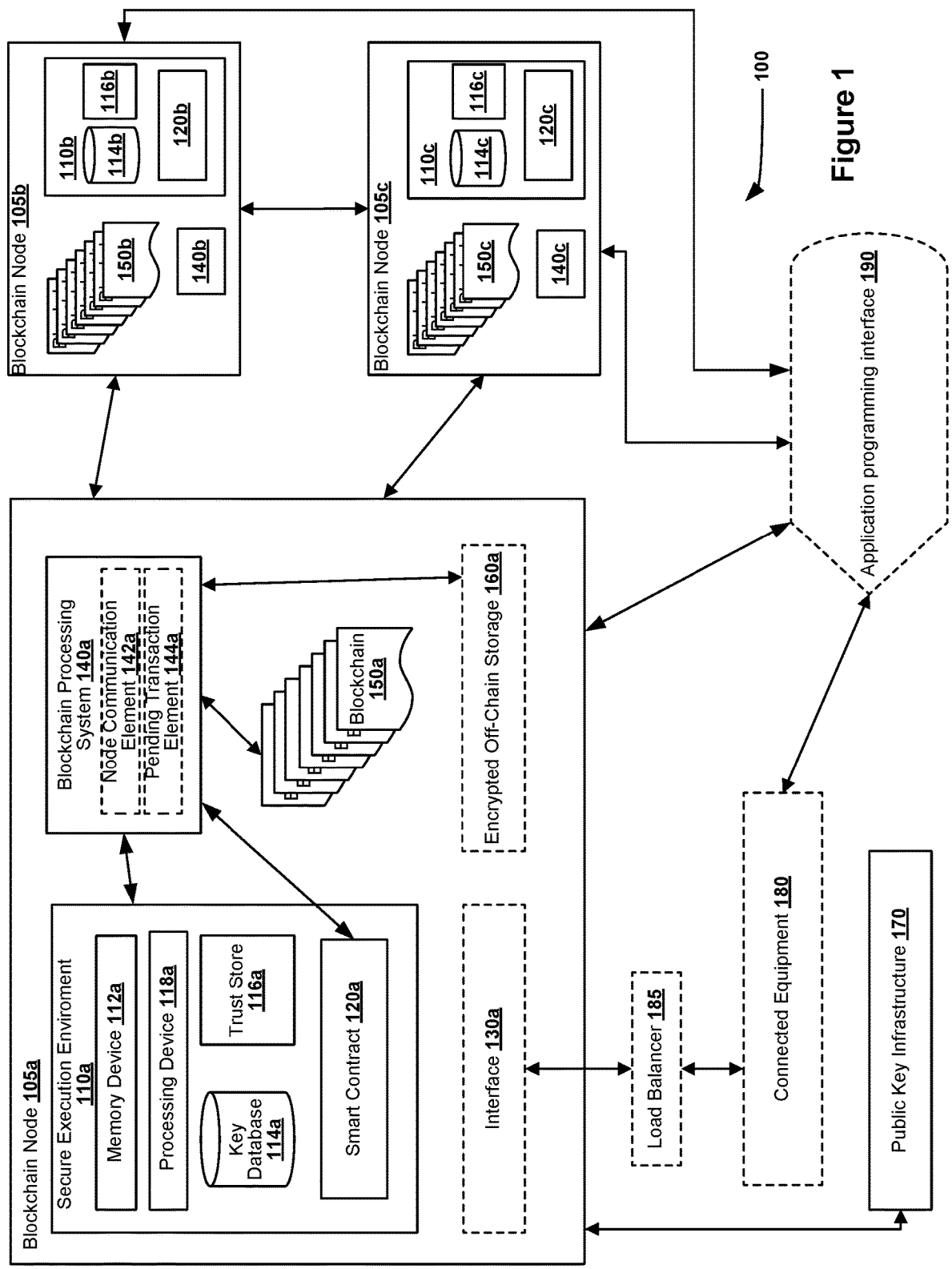
FIG. 1 is a schematic illustration of a privacy transaction management system using a plurality of blockchain nodes, in accordance with an embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

As used further herein, "CA" may refer to a certificate authority hosting a root certificate, and may further include, without limitation, one or more of a CA computer system, a CA server, a CA webpage, and a CA web service.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include computer program storage in memory for execution by personal computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

In exemplary embodiments of the present systems and methods, an X.509 trust model is utilized, in which a trusted third party CA is responsible for signing digital certificates. Accordingly, as described herein, the CA may be presumed to have capability to store one or more trusted root certificates (or intermediate certificates) as well as the corresponding private keys. The CA may be further responsible for maintaining up-to-date revocation information regarding the validity of issued certificates, and will provide information to the other parties, for example, through an Online Certificate Status Protocol (OCSP). In some embodiments, the CA may provide information according to a Certificate Revocation List (CRL). The OCSP is an Internet protocol for obtaining a revocation status of an X.509 digital certificate, and is generally considered an alternative to the CRL. OCSP messages may be communicated, for example, by Abstract Syntax Notation One (ASN.1) encoding over the Hypertext Transfer Protocol (HTTP), from and to OCSP responders of the CA server (or OCSP server).

In exemplary operation, the CA issues PKI certificates and public keys to the entities, applications, or devices within the operational system. The CA receives request messages from these various participants and confirms the revocation status of a corresponding certificate (e.g., stored in the trusted database of the CA). The CA then transmits a response message indicating the revocation status (e.g., "valid," "revoked," "unknown," etc., or an error message if the request message may not be processed). In the exemplary embodiment, the CA generates or records the issuance of the public/private keypairs. In some embodiments, the CA further optionally generates/records the certificates associated with the keypairs. The generated keys may be for a single keypair, multiple keypairs for a single ecosystem, or multiple keypairs for different ecosystems.

The present systems and methods herein advantageously utilize distributed ledgers to manage and secure the privacy of consumer information. The distributed ledgers described and illustrated herein may include, for example, blockchain technology to create digital ledgers. For ease of explanation, the following description references a "blockchain", or "blockchains", as exemplary embodiments of distributed ledger technology. A person of ordinary skill in the art though, upon reading and comprehending the present description and associated illustrations, will understand that other examples of distributed ledger technologies may be implemented according to the novel and advantageous principles herein.

That is, in the following disclosure, the phrases "distributed ledger" and "blockchain" are used. In conventional practice literature, these two concepts are often considered to be synonymous. However, within this application, the two concepts may further differ in terms of their respective use and implementation. For example, in some instances the phrase "distributed ledger" may refer to how the ledger or blockchain is used, namely, the accessible distributed ledger as available to prove the facts of a transaction by virtue of being distributed amongst a consensus pool. A "blockchain," on the other hand, may refer to the process by which the distributed ledger is created and operated. For example, a blockchain may create a distributed ledger, but a distributed ledger may be created by other technologies as well. In the following description, the phrase "digital ledger" may refer to either or both of a distributed ledger and a blockchain, and for ease of explanation, references to "blockchain" are intended to indicate a representative example of immutable ledger technology, but are not intended to be limited to blockchain embodiments only.

The present solutions may be advantageously implemented as standalone systems, or as complementary systems or subsystems to conventional systems that rely on trusted parties recording events into databases or other record keeping mechanisms, often using trusted labels According to the embodiments herein, digital ledgers are implemented to create secure and immutable records of transactions. In these records, the transaction information is encoded into formats, digitally signed using a cryptographic technique, and submitted to a network of processors of a distributed ledger network. These processors validate the submitted transactions for accuracy, and the validated transactions are subsequently added to a queue or stack of the immutable ledger. At some point, according to a predetermined criterion (such as, but not limited to, an interval of time, a volume of data, a number of transactions, or combination of these and other factors), the queued or stacked transactions are sequentially hashed (e.g., using a Merkle process), and collectively encoded into a block (e.g., in the case of blockchain) which is then hashed with the hash of the proceeding block using cryptographic processes. An algorithm will allow multiple processors to select a block from amongst many processors to be the block added to the blockchain.

In exemplary embodiments, the digital ledger is a blockchain. Exemplary systems and methods of digital ledgers and blockchain technology are described in greater detail in co-pending U.S. patent application Ser. No. 15/345,411, filed Nov. 7, 2016, U.S. patent application Ser. No. 15/376, 375, filed Dec. 12, 2016, U.S. patent application Ser. No. 15/476,111, filed Mar. 31, 2017, and U.S. patent application Ser. No. 15/476,098, filed Mar. 31, 2017, all of which are incorporated by reference herein.

According to the present systems and methods, digital ledger techniques may be utilized to better secure information and transactions from consumers. The principles described herein may be applicable to simple currency transactions or negotiations (e.g., bitcoin) between parties, and/or non-financial consumer information or content in general. That is, the private consumer information may be considered as the "currency" to which the present embodiments may be advantageously employed. Such nonfinancial content, for purposes of this discussion, includes, but is not limited to, smart contracts, shared media, software, copyrighted works, licenses, security credentials, and other forms of transferable content that are not strictly currency only. Such information is sometimes referred to as "licensed-burdened content," "valuable encumbered content," or "Content as Currency" (CAC).

As described above, blockchaining utilizes cryptographic techniques to create digital ledgers of transactions. According to the systems and methods described herein, the application of blockchaining to CAC transactions has wide applicability to companies desiring, or required, to increase the security of information/transactions over networks. In addition to CAC information, the present embodiments will further significantly increase the privacy security in areas including, without limitation: smart contracts; enhanced content protection; digital rights management (DRM); secure imaging; distributed denial of service (DDoS) mitigation and/or attacks; scalable Internet of Things (IoT) security solutions; supply chain integrity; device registration, and enhanced DRM and data over cable service interface specification (DOCSIS) security; enhanced content protection; connectivity negotiation; dynamic service creation or provisioning; service authentication; virtualization orchestration; and billing transformation.

The embodiments described herein provide systems and methods for monitoring and maintaining the privacy of an individual user or device in communication with a secure environment.

In an exemplary embodiment, a privacy transaction management system allows consumers to opt-in and opt-out for advertisements and other offers. The privacy transaction management system acts as a protective interface, or "midbox", that maintains a secure database of consumer information and opt-in/out decisions. The privacy transaction management system receives consumer information directly from the consumer and securely stores that information. In the exemplary embodiment, the privacy transaction management system stores the information in an immutable ledger structure, and the information may be encrypted using public/private key encryption. For example, the information may be encrypted with the public/private key pair of the consumer and also by a key pair associated with the individual transaction. In other embodiments, the information is stored in other distributed ledgers or databases (e.g., a blockchain).

The present privacy transaction management system advantageously allows consumers to register in order to opt-in, to review their data, and to allow them to alter their data, including allowing the consumer to opt-out. The privacy transaction management system may then interface with advertisers to provide the advertisers with the information for those consumers that have opted-in. The consumer is advantageously enabled to avoid having to directly communicate with known or unknown advertisers; the present system serves to function as a single point of interface between an individual consumer and the myriad of potential advertisers and other entities that seek access to a consumer's individual data.

In the following embodiments, "blockchain" refers to a distributed database that is capable of maintaining a continuously-growing list of ordered records, known as blocks. Each block may contain at least a timestamp and a link to the previous block in the chain. The link to the previous block may be a hash of the previous block. For storing consumer information, the first block may contain personal information for a first consumer. The second block may store personal information for a second consumer. The second block may contain a hashed copy of the first block as well. The third block may contain changes or updates to the opt-in/out choices for the first consumer. This continues on with each block adding on to the next while containing a hash of the previous blocks in the blockchain.

To ensure the security of the information contained in the blockchain, copies of the blockchain may be distributed across multiple computer devices, known as nodes. These nodes maintain the blockchain, update the blockchain when changes occur, and ensure the stability of the blockchain itself. In some embodiments, nodes may be also used to calculate the hash of the previous blocks. As the blockchain grows, the processing power needed to calculate the hash of the previous blocks grows as well. In these embodiments, the processing of the hash may be distributed over multiple computer devices to improve the speed of processing and/or to not overburden the hashing processor. When a node processes (hashes) a block, that node is known as a miner, where the action of validating and hashing the block is also known as mining.

In addition, a permissioned blockchain requires that a user has permission to read the data in the blockchain. In some embodiments, the node has permission to access the blockchain data. When a requestor computer device requests access to the data, node authenticates the requestor before granting access to the data. In some embodiments, the node reads the pertinent consumer data off of the blockchain without giving the requestor direct access to the blockchain itself.

FIG. 1 is a schematic illustration of a privacy transaction management system 100 using a plurality of blockchain nodes 105. In an exemplary embodiment, each blockchain node 105 includes one or more of: a secure execution environment 110 having a memory device 112, a processing device 112, a key database 114, a trust store 116, and a smart contract 120; an communication interface 130; a blockchain processing system 140 having a node communication element 142 and a pending transaction element 144; a blockchain 150 (i.e., digital ledger); and an encrypted off-chain storage 160. In some embodiments, system 100 further includes one or more of a PKI subsystem 170, at least one connected equipment 180, a load balancer 185, and an application programming interface (API) 190.

In the exemplary embodiment, the privacy transaction management system 100 serves as a central repository that is independent from the various advertisers and other entities that are interested in the consumer information. In some embodiments, the privacy transaction management system 100 is associated with a plurality of Internet service providers (ISP). In other embodiments, the privacy transaction management system 100 is associated with other third parties.

In the exemplary embodiment, the privacy transaction management system 100 includes a plurality of blockchain nodes 105a, 105b, and 105c. In some embodiments, each blockchain node 105a, 105b, and 105c is associated with a different ISP, where the corresponding ISP maintains the node. In other embodiments, each ISP may maintain multiple blockchain nodes 105. Each blockchain node 105a, 105b, and 105c stores a copy of blockchain 150a, 150b, and 150c. The various nodes 105a, 105b, and 105c work together to add additional blocks to the blockchain and maintain a common chain. In the exemplary embodiment, the blockchain 150 is a permissioned, private blockchain, where only those allowed to access to the blockchain may add blocks or read data. In this embodiment, the data on the blockchain is also encrypted so that only those with the decryption key(s) may read the data on the blockchain 150.

In the exemplary embodiment, the blockchain node 105a includes the secure execution environment 110a, the blockchain processing system 140a, and a copy of the blockchain 150a. In some embodiments, the blockchain node 105a may optionally include the communication interface 130a for communicating with non-node computer devices and the encrypted off-chain storage 160a.

In exemplary operation, the blockchain processing system 140a communicates with the other blockchain processing systems 140b and 140c to coordinate which transactions are added to blocks and to generate blocks for the blockchain 150. In further exemplary operation, the blockchain processing system 140a utilizes the node communication element 142a to communicate with the other blockchain processing systems 140b and 140c. in the exemplary embodiment, the blockchain processing system 140a includes the optional pending transaction element 144a, which is configured to store pending transactions that have not been added to a block. In some embodiments, a new block is added to the blockchain 150 after a predetermined period of time. In other embodiments, a new block is added after a predetermined number of transactions are ready to be added to a block.

In an exemplary embodiment, the secure execution environment 110a further includes at least one memory device 112a, at least one processing device 118a, the key database 114a, the trust store 116a, and the smart contract 120a. In the exemplary embodiment, the secure execution environment 110a includes signed firmware and software to prevent modification by unauthorized individuals. In an embodiment, the key database 114a represents a database of encryption keys. The trust store 116a stores certificates to prove trust with one or more signing authorities, such as a root certificate authority and a signing node authority as further described below. In the exemplary embodiment, the trust store 116a stores the certificates of other blockchain nodes 105b and 105c that are authorized to communicate with the blockchain node 105a. The trust store 116a also stores certificates of advertisers and other individuals that are authorized to access data on the blockchain 150a. In the exemplary embodiment, the key database 114a stores the private key of the blockchain 150, encryption keys associated with other blockchain nodes 105b and 105c, and encryption keys associated with the advertisers and other individuals.

As described herein, smart contract 120a includes a collection of signed logic that allows for the processing described herein. The person of ordinary skill in the art will understand that the phrase "smart contract" is defined herein by way of example, for ease of explanation, but is not intended to be limiting. That is, in this example, a consumer may state in their opt-in choices that certain individuals only have access to their information for a specific period of time. The logic may check to ensure that the access rights have not expired. The logic contained in the "smart contract" may perform other checks and processes as described herein. In another example, the subscriber has limited the access to their streaming information, where they are willing to share their movie streaming viewing information, but not their television show streaming viewing information. This example of smart contracts indicates merely one example of a "smart contract" as the phrase is more generally used.

In some exemplary operation, the privacy transaction management system 100 utilizes API 190 for accessing data from the blockchain nodes 105a, 105b, and 105c. In these instances, the API 190 may be executed by connected equipment 180 to allow a user to access data on the blockchain 150. The connected equipment 180, may include, but is not limited to a client computing device (e.g., a smartphone, tablet, laptop, desktop computing device, wearable, or other computing device), or another type of device that allows the system to work as described herein. The user may be a consumer looking to add, review, or update information about themselves. The user may also be an advertiser looking for information about consumers who have opted-in. In such cases, the privacy transaction management system 100 may also include the optional load balancer 185, which may be configured to determine which blockchain node 105a, 105b, or 105c should be in communication with the API 190 and the connected equipment 180. In some embodiments, the load balancer 185 determines the appropriate blockchain node 105 based on geographic distance, processing load, the transaction being requested, predetermined rules, or any other rationale to allow the system to work as described herein.

In some embodiments, each blockchain node 105 also utilizes the communication interface 130 for communicating between the blockchain node 105 and any non-node computer devices. In these embodiments, the communication interface 130a communicates with the API 190 when blockchain node 105a is accessed. In some embodiments, when an advertiser uses the API 190 to request a list of opted-in consumers, the advertiser is not given access to the blockchain 150 itself. Instead, the communication interface 130a receives the request for the list of consumers and their associated information. The secure execution environment 110 and the blockchain processing system 140 access the blockchain 150 to retrieve the requested data. The blockchain processing system 140 may also retrieve data from the encrypted off-chain storage 160. Then the retrieved data is sent to the communication interface 130, which then transmits the data to the API 190. In some further embodiments, the API 190 communicates directly with one of the secure execution environment 110 and the blockchain processing system 140.

In some embodiments, each blockchain node 105 further includes the encrypted off-chain storage 160. Because storage space may be limited on the blockchain 150, the encrypted off-chain storage 160 may advantageously provide the privacy transaction management system 100 with additional secured storage for additional information. For example, the encrypted off-chain storage 160a may store browsing history or viewing history of the consumer. In a healthcare embodiment, medical history information, such as X-rays, MRI results, and medical case histories, may be stored remotely from the blockchain 150 in the off-chain storage 160. In these embodiments, the blockchain processing system 140 may coordinate between the information stored in the blockchain 150 and the information stored in off-chain storage 160. For example, the data on the blockchain 150 may include a link to and a key to access the information in the encrypted off-chain storage 160.

In some further embodiments, the blockchain 150 stores a unique identifier for each consumer and the consumer's opted-in or out decisions. When accessing data about the consumer, the blockchain processing system 140 retrieves the unique identifier and opt-in/out status. If the consumer is opted-in, then the blockchain processing system 140 accesses the encrypted off-chain storage 160 to retrieve additional information about the consumer.

In the exemplary embodiment, each blockchain node 150 is connected to PKI subsystem 170, which, in some embodiments, represents a trusted CA that maintains one or more digital certificates used by the privacy transaction management system 100. Conventional electronic devices interact with a number of secure electronic networks and computer systems. Although many of these networks and systems are subject to significant security protections, the electronic devices that interact therewith may not be subject to the same levels of security. Therefore, it is important to be able to reliably determine the identity of such electronic devices in order to provision the devices for use within a particular network, system, or ecosystem. Such provisioning techniques are not trivial.

Figure 2:
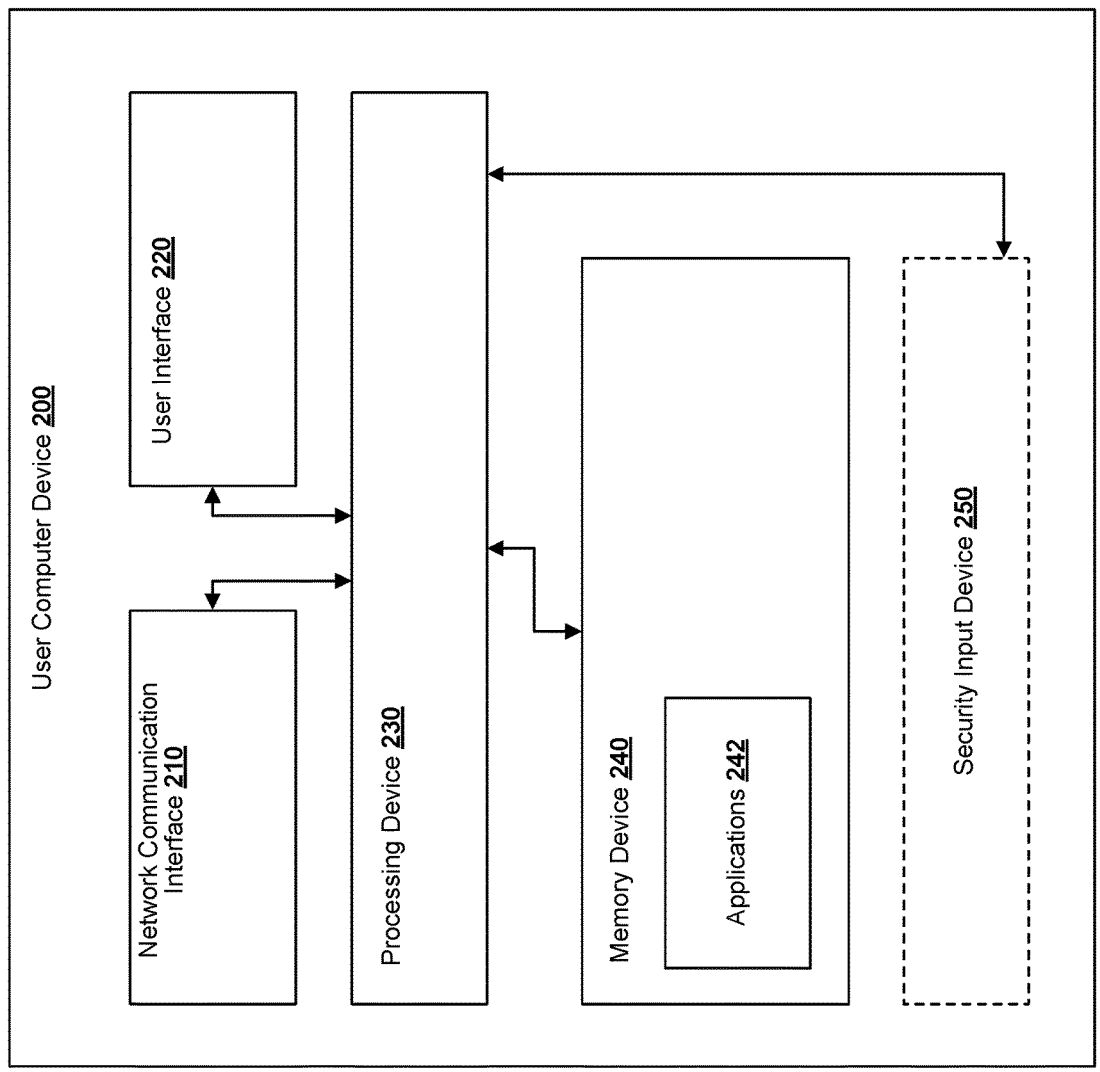
FIG. 2 is a schematic illustration of a connected user computer device for connecting to one or more of the blockchain nodes in the privacy transaction management system shown in FIG. 1, in accordance with an embodiment.

FIG. 2 is a schematic illustration of a connected user computer device 200 for connecting to one or more of the blockchain nodes 105 in the privacy transaction management system 100 shown in FIG. 1. In an exemplary embodiment, user computer device 200 includes a network communication interface 210, a user interface 220, a processing device 230, a memory device 240 having one or more applications 242, and an optional security input device 250.

In the exemplary embodiment, user computer device 200 may be a computer that includes a web browser or a software application, which enables the user computer device 200 to access remote computer devices using the Internet or other network. More specifically, user computer device 200 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. User computer device 200 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In some embodiments, user computer device 200 may be similar to connected equipment 180 (shown in FIG. 1).

User computer device 200 may be operated by a user. User computer device 200 utilizes the processing device 230 for executing instructions. In some embodiments, executable instructions may be stored in the memory device 240. In some embodiments, the executable instructions include the applications 242. Processing device 230 may include one or more processing units (e.g., in a multi-core configuration). Memory device 240 may be a device configured to allow information, such as executable instructions and/or transaction data, to be stored and retrieved. Memory device 240 may include one or more computer readable media (not separately shown).

User computer device 200 may further utilize the user interface 220 for presenting information to the user. User interface 220 may be any component capable of conveying information to the user. In some embodiments, user interface 220 may include an output adapter (not shown) such as a video adapter and/or an audio adapter. An output adapter may be operatively coupled to the processing device 230 and operatively coupleable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, the user interface 220 may present a graphical user interface (e.g., a web browser and/or a client application) to the user. The graphical user interface may include, for example, an online interface for viewing consumer information. In some embodiments, the user interface 220 may include an input device for receiving input from the user. The user may use the input device to, without limitation, enter or update consumer information.

The Input device may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as the user interface 220 including both an output device and an input device.

User computer device 200 may communicatively couple the network communication interface 210 to a remote device (not shown). The network communication interface 210 may include, for example, a wired or wireless network adapter and/or a wireless data transceiver for use with a mobile telecommunications network.

Stored in the memory device 240 are, for example, computer readable instructions for providing the user interface 220 to the user via output device and, optionally, receiving and processing input from the input device. The user interface 220 may include, among other possibilities, a web browser and/or a client application. Web browsers enable users to display and interact with media and other information typically embedded on a web page or a website. One or more of the client applications 242 may allow the user to interact with, for example, one or more blockchain nodes 105 (shown in FIG. 1). For example, instructions may be stored by a cloud service, and the output of the execution of the instructions sent to the user interface 220.

In some embodiments, the user computer device 200 includes the optional security input device 250, which may be, for example, a physical key that attaches to the user computer device 200. In other embodiments, the security input device 250 may be an electronic token or digital certificate that is stored in the memory device 240 of the user computer device 200. In still further embodiments, the security input device 250 may be a camera, fingerprint reader, or other biometric device. In these embodiments, an image of the user or the user's fingerprint may be used to generate unique security keys for the user.

Figure 3:
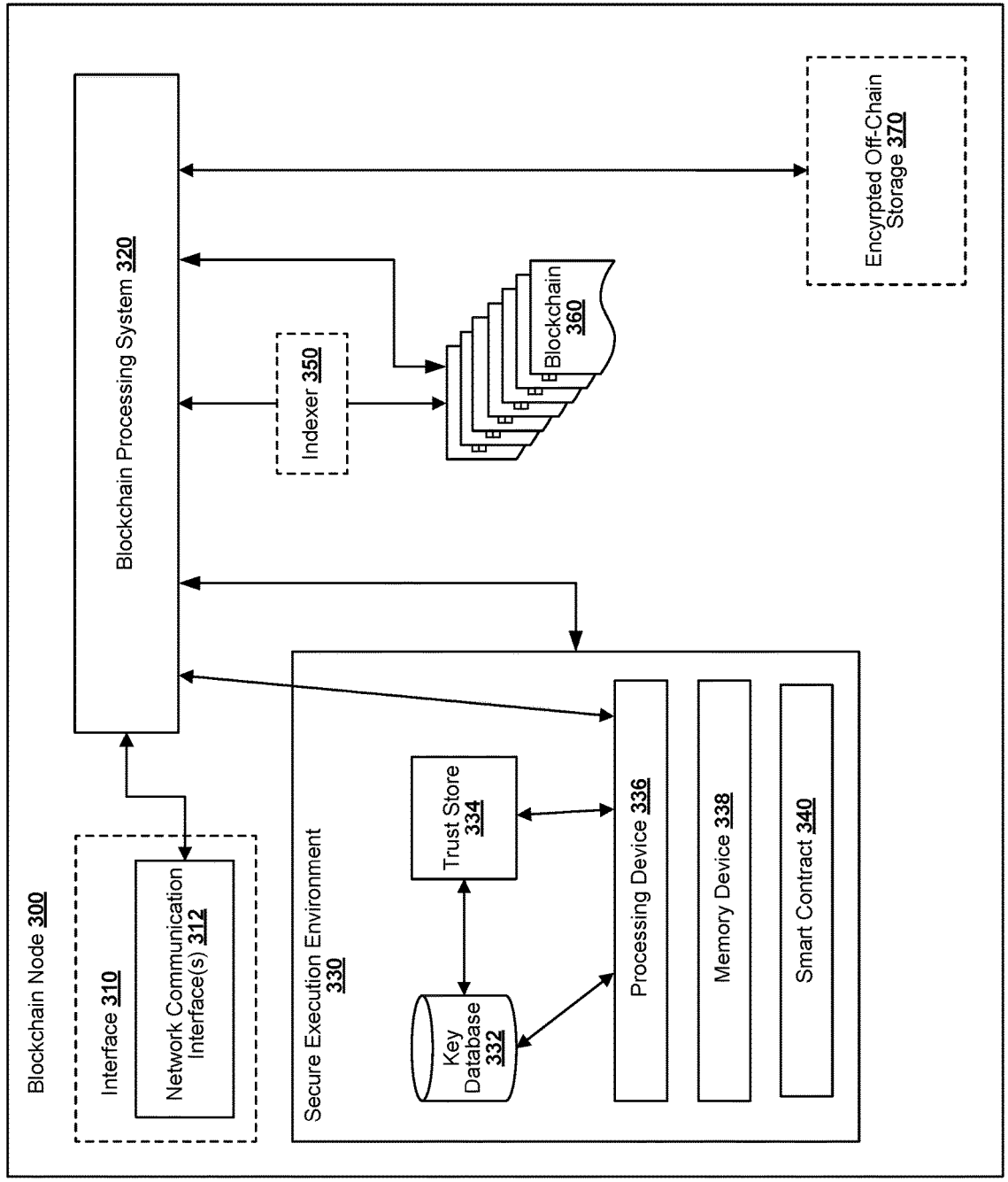
FIG. 3 is a schematic illustration of a blockchain node shown in the privacy transaction management system in FIG. 1.

FIG. 3 is a schematic illustration of a blockchain node 300 shown in the privacy transaction management system 100 in FIG. 1. In the exemplary embodiment, the blockchain node 300 is similar to blockchain node 105 (shown in FIG. 1).

In the exemplary embodiment, blockchain node 300 includes an interface 310 with a network communication interface 312 for communicating with remote devices. For example, blockchain node 300 may use the interface 310 and/or the network communication interface 312 to communicate with other blockchain nodes 300. The blockchain node 300 may also use the interface 310 and/or the network communication interface 312 to communicate with remote computer devices, such as user computer device 200 (shown in FIG. 2). In an exemplary embodiment, the blockchain node 300 further includes a blockchain processing system 320.

The blockchain node 300 also includes a secure execution environment 330, which may be similar to the secure execution environment 110 (shown in FIG. 1). In the exemplary embodiment, the secure execution environment 330 includes a key database 332, a trust store 334, and at least one processing device 336 for executing instructions. In some embodiments, executable instructions may be stored in at least one memory device 338. The processing device 336 may include one or more processing units (e.g., in a multi-core configuration). The memory device 338 may be any device allowing information such as executable instructions and/or transaction data to be stored and retrieved. The memory device 338 may include one or more computer readable media.

The key database 332 is a database of encryption keys. The trust store 334 stores certificates to prove trust with one or more signing authorities, such as a root certificate authority and a signing node authority as further described below. In the exemplary embodiment, the trust store 334 stores the certificates of other blockchain nodes that are authorized to communicate with the blockchain node 300. In an exemplary embodiment, the secure execution environment 330 further includes a smart contract 340. Similar to the embodiments described above, the smart contract 340 includes a collection of signed logic that allows for the processing described herein. For example, a consumer may state in their opt-in choices that certain individuals only have access to their information for a specific period of time. The logic may check to ensure that the access rights have not expired. The logic contained in the smart contract may perform other checks and processes as described herein.

In an exemplary embodiment, the blockchain processing system 320 is similar to blockchain processing system 140 (shown in FIG. 1), and may include one or more processors and one or more memory devices (not separately shown). In the exemplary embodiment, the blockchain processing system 320 is in operable communication with an optional indexer 350, or directly in communication with a blockchain 360, which may be similar to blockchain 150 (shown in FIG. 1). Blockchain processing system is configured to manage the blockchain 360, and functions to coordinate with other blockchain processing systems 320 to add blocks to the blockchain 360, resolve discrepancies with other copies of the blockchain 360, and maintain blockchain 360.

In the exemplary embodiment, blockchain processing system 320 reads data from the blockchain 360. In these embodiments, the blockchain node 300 includes the indexer 350, which is configured to monitor the data in the blockchain 360 to create an index of the data in the blockchain 360. For example, rather than requiring the blockchain processing system 320 to parse through all of the blocks to find out data about an individual consumer, the indexer 350 lists every block where that consumer is listed. In other embodiments, the indexer 350 just lists the last block that contains a transaction for the consumer. In some embodiments, the indexer 350 maintains the index on a periodic basis, such as once a day. In these embodiments, the blockchain processing system 320 only has to review those blocks since the last indexing to ensure that all of the data about the consumer is retrieved.

In some embodiments, each blockchain node 300 also includes encrypted off-chain storage 370, which may be similar to encrypted off-chain storage 160 (shown in FIG. 1). Storage space may be limited on the blockchain 360 and the encrypted off-chain storage 370 allows for additional secured storage for additional information. For example, the encrypted off-chain storage 370 may store browsing history of viewing history of the consumer. In a healthcare embodiment, medical history information, such as X-rays, MRI results, and medical case histories, may be stored remotely from the blockchain 360 in the off-chain storage 370. In these embodiments, the blockchain processing system 320 may coordinate between the information stored in the blockchain 360 and the information stored in off-chain storage 370. For example, the data on the blockchain 360 may include a link to and a key to access the information in the encrypted off-chain storage 370.

In some further embodiments, the blockchain 360 stores a unique identifier for each consumer and whether or not the consumer is opted-in or out. When accessing data about the consumer, the blockchain processing system 320 retrieves the unique identifier and opt-in/out status. If the consumer is opted-in, then the blockchain processing system 320 accesses the encrypted off-chain storage 370 to retrieve additional information about the consumer.

Figure 4:
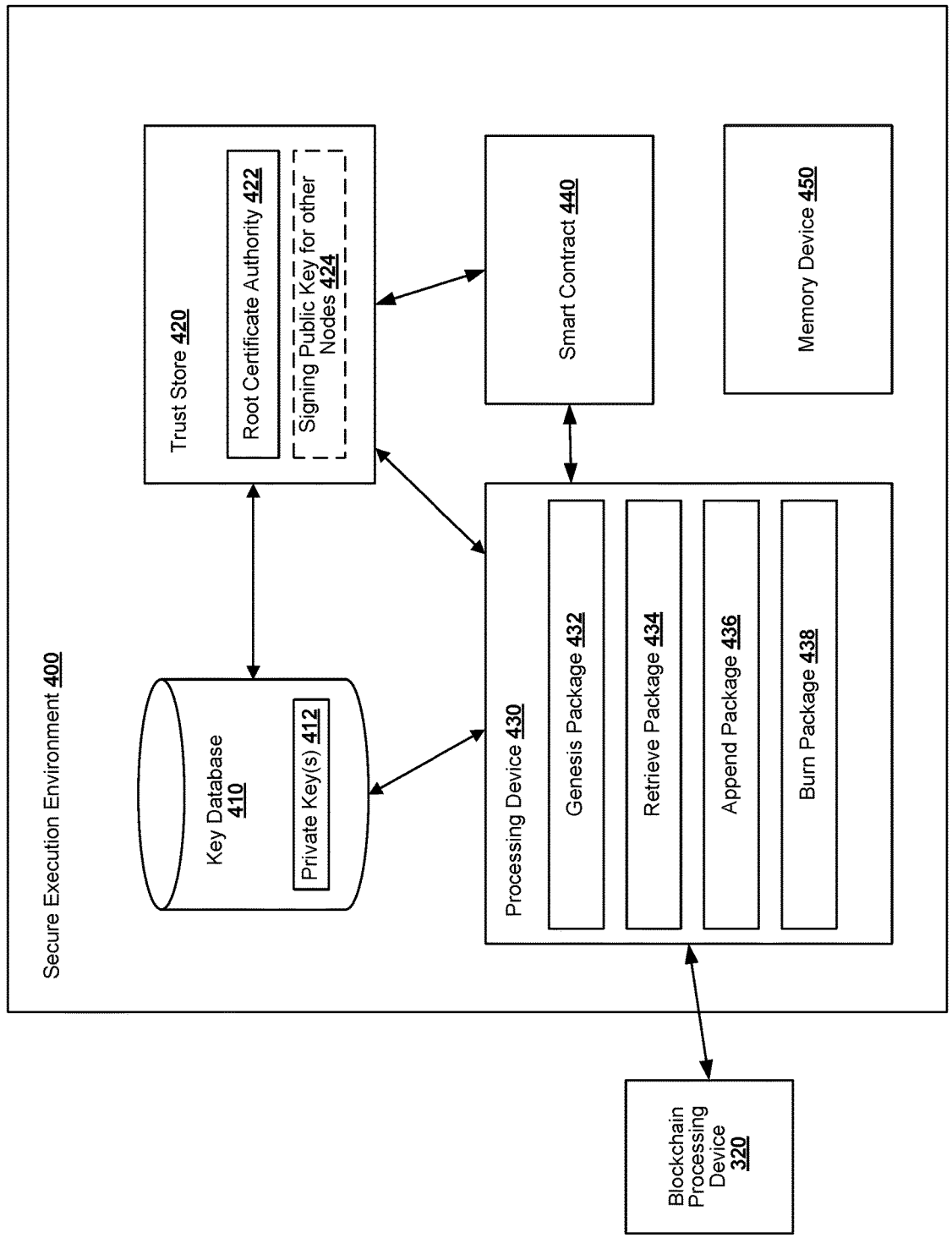
FIG. 4 is a schematic illustration of a secure execution environment of the blockchain node shown in FIG. 3 using the privacy transaction management system shown in FIG. 1.

FIG. 4 is a schematic illustration of a secure execution environment 400 of a blockchain node 300 (shown in FIG. 3) using the privacy transaction management system 100 (shown in FIG. 1). In an exemplary embodiment, secure execution environment 400 is similar to secure execution environment 110 (shown in FIG. 1) and secure execution environment 330 (shown in FIG. 3). In the exemplary embodiment, the secure execution environment 400 includes signed firmware and software to prevent modification by unauthorized individuals.

In the exemplary embodiment, the secure execution environment 400 includes a key database 410 having one or more private keys 412, a trust store 420 having a root certificate authority 422 and an optional public key 424, and at least one processing device 430 for executing instructions. In the exemplary embodiment, the processing device 430 executes a plurality of software packages to perform specific processes. One package is a genesis package 432 for adding a consumer to the blockchain 360 (shown in FIG. 3). The process 600 for the genesis package 432 is shown in FIG. 6. Another package is a retrieve package 434 for retrieving data from the blockchain 360. The process 700 for the retrieve package 434 is shown in FIG. 7. A further package is an append package 436 for updating the information about the consumer in the blockchain 360. The process 800 for the append package 436 is shown in FIG. 8.

In addition, a burn package 438 for removing a consumer from being presented to advertisers or other requestors is provided. While the burn package 438 does not remove all of the consumer's information from the blockchain 360, it does set options or flags on the consumer's account so that the consumer's information is not disseminated. In some embodiment, the consumer may selectively use the burn option. For example, a consumer may only allow a specific company to use their information. In another example, the consumer may request that every occurrence of "use my location" be burned.

In some embodiments, secure execution environment 400 further includes a smart contract 440 and at least one memory device 450. Executable instructions may, for example, be stored in the memory device 450. The processing device 430 may include one or more processing units (e.g., in a multi-core configuration). The memory device 450 may be any device allowing information such as executable instructions and/or transaction data to be stored and retrieved. The memory device 450 may include one or more computer readable media. The processing device 430 is in communication with the blockchain processing device 320.

In an embodiment, the key database 410 is a database of encryption keys. In the exemplary embodiment, the key database 410 stores private keys 412 for transactions. In this embodiment, a public key/private key pair is generated for each consumer on the blockchain 360. The key database 410 stores the transaction private keys 412 for future retrieval. The trust store 420 stores certificates to prove trust with one or more signing authorities, such as a root certificate authority 422 and a signing node authority 424.

In the exemplary embodiment, the trust store 420 stores the certificates of other blockchain nodes that are authorized to communicate with the blockchain node 300. The trust store 420 also stores certificates of advertisers and other individuals that are authorized to access data on the blockchain 360. The trust store 420 may receive certificates from the PKI subsystem 170 (shown in FIG. 1). In the exemplary embodiment, the key database 410 stores the private key of the blockchain 360, encryption keys associated with other blockchain nodes, and encryption keys associated with the advertisers and other individuals.

The smart contract 440 includes a collection of signed logic that allows for the processing described herein. For example, a consumer may state in their opt-in choices that certain individuals only have access to their information for a specific period of time. The logic may check to ensure that the access rights have not expired. The logic contained in the smart contract may perform other checks and processes as described herein.

The respective processes depicted in FIGS. 5-8 are described with respect to execution by, or in relation to various elements, including one or more of a subscriber 505, a computer device 510, a node portal 515, a node processor 520, a node trusted platform module (TPM) 525, and a blockchain 530. Several of these elements may be considered similar in structure and function to elements described above using the same respective labels. However, the person of ordinary skill in the art will understand that exemplary elements are provided for ease of illustration, and are not intended to be limiting. That is, the operation of the following processes is not limited strictly to the specific elements provided in the examples, nor are the several elements limited to the exemplary descriptions provided throughout this description.

FIG. 5 is data flow diagram of a process 500 of a subscriber 505 pre-registering to use the privacy transaction management system 100 (shown in FIG. 1). In the exemplary embodiment, subscriber A 505 is using computer device 510 to register for the privacy transaction management system 100. In the exemplary embodiment, computer device 510 is similar to user computer device 200 (shown in FIG. 2). In the exemplary embodiment, process 500 occurs before the subscriber 505 has ever accessed the privacy transaction management system 100 and does not have an entry on the blockchain 360 (shown in FIG. 3).

In the exemplary embodiment, the subscriber A 505 requests S550 that the computer device 510 generates a private key. In some embodiments, the computer device 510 generates S555 a private key through the use of a trusted platform module (TPM) of the computer device 510. In other embodiments, the computer device 510 has the subscriber 505 take a photograph with objects in the image to create entropy. Then the computer device 510 generates S555 the private key from the photograph. In still other embodiments, the computer device 510 uses a fingerprint scan as the seed to generate S555 the private key. The computer device 510 also generates S560 a public key. As used herein, subscriber A's private key will be notated as Kay, where 'K' stands for key, 'a' stands for subscriber A 505, and 'v' stands for private. Subscriber A's public key will be notated as Kab, where 'b' stands for public.

Once the key pair is generated, the subscriber 505 enters S565 personal information into the computer device 510. The personal information may include, but is not limited to, name, age, address, postal code, other demographic data, and searchable fields to engage with advertisers. In an example, the subscriber has limited the access to their streaming information, where they are willing to share their movie streaming viewing information, but not their television show streaming viewing information. The computer device 510 retrieves S570 the chain's public key (Kcb), where the 'c' stands for chain) for the privacy transaction management system 100. The computer device 510 encrypts S575 the subscriber's personal information using the subscriber's private key Kay and the chain's public key (Kcb). The computer device 510 notifies S580 the subscriber 505 that they are ready to proceed with registering and proceeding to process 600 as shown in FIG. 6.

FIG. 6 is a data flow diagram of a process 600 of the subscriber 505 registering with the blockchain 150 (shown in FIG. 1) using the privacy transaction management system 100 (shown in FIG. 1). In the exemplary embodiment, subscriber A 505 is using computer device 510. In the exemplary embodiment, computer device 510 is similar to connected equipment 180 (shown in FIG. 1) and user computer device 200 (shown in FIG. 2). Computer device 510 is in communication with a node portal 515, which allows the computer device 510 to communicate with the privacy transaction management system 100. In some embodiments, node portal 515 is similar to interface 130a (shown in FIG. 1). In other embodiments, node portal 515 is similar to API 190 (shown in FIG. 1). The node portal 515 communicates with node processing 520 for the blockchain node 300 of the blockchain 530 that the computer device 510 is being directed to. In the exemplary embodiment, node processing 520 is similar to secure execution environment 110a (shown in FIG. 1), secure execution environment 330 (shown in FIG. 3), and secure execution environment 400 (shown in FIG. 4). In the exemplary embodiment node TPM 525 is a combination of key database 410 and trust store 420 (both shown in FIG. 4). Node TPM 525 allows for communication with the key database 410 and trust store 420, but not direct access. Node TPM 525 contains processing that performs actions on the key database 410 and trust store 420 upon request, but does not allow read or write access to either. Blockchain 530 is similar to blockchain 150 (shown in FIG. 1) and blockchain 360 (shown in FIG. 3) and may also include blockchain processing system 140a (shown in FIG. 1) and blockchain processing system 320 (shown in FIG. 3).

In the exemplary embodiment, process 600 occurs the first time that the subscriber 505 accesses the privacy transaction management system 100 and does not have an entry on the blockchain 530.

In the exemplary embodiment, the subscriber 505 requests S605 to register with the privacy transaction management system 100. The computer device 510 transmits S610 the registration information to the node portal 515. The registration information includes, but is not limited to, subscriber A's public key (Kab) and subscriber A's personal information. The personal information is encrypted with the blockchain's public key (Kcb). In some embodiments, the computer device 510 transmits S610 the registration information over the TLS protocol.

The node portal 515 determines S615 which node TPM 525 to transmit the registration to. In some embodiments, the node portal 515 determines S615 the node TPM 525 based on geographic proximity, processing load of the various nodes, or any other set of rules.

Once the destination node TPM 525 is determined, the node portal 515 transmits S620 the registration information to the node processing 520 associated with the determined node TPM 525. The node processing 520 communicates with the node TPM 525 to generate S625 a chain key (Kac) for subscriber A 505 based on the subscriber's public key (Kab). In some embodiments, the node TPM 525 generates S625 the chain key using symmetric key cryptographic algorithms. The node processing 520 communicates with the node TPM 525 to encrypt S630 the subscriber's chain key (Kac) with the blockchain's private key (Kcv) to create an encrypted chain key (K'ac). The node TPM 525 transmits the encrypted chain key (K'ac) to the node processing 520. The node processing 520 transmits S640 the registration information (subscriber A's personal information and subscriber A's public key [Kab]) to the node TPM 525. In some embodiments, the multiple calls between node processing 520 and node TPM 525 could be performed with fewer calls by combining messages.

The node TPM 525 determines S645 the decryption key for subscriber A's public key (Kab). The node TPM 525 decrypts S650 the personal information using the chain's private key (Kcv). Then the node TPM 525 encrypts S655 the personal information using the subscriber's chain key (Kac). The node TPM 525 transmits S660 the re-encrypted personal information to the node processing 520. The node processing 520 submits S665 the encrypted personal information, the encrypted chain key (K'ac), and the subscriber's public key (Kab) to be stored on the blockchain 530.

In the exemplary embodiment, the submission to the blockchain 530 includes i) the personal information encrypted with the subscriber's key chain (Kac), ii) the encrypted subscriber's chain key (K'ac), which may be decrypted by the node's private chain key (Kcv) help by the node TPM 525, and iii) the subscriber's public key (Kab), which all future chain blocks associated with the subscriber will be associated with.

In the exemplary embodiment, the encrypted subscriber's chain key (K'ac) is always in the subscriber's first entry in the blockchain 530. The subscriber's most recent entry in the blockchain 530 contains i) the subscriber's public key (Kab), which may be used as an index to find entries associated with the subscriber 505 in the blockchain 530 and ii) all of the subscriber's personal information encrypted with the subscriber's key chain (Kac). Every time that the subscriber's personal information is updated, as described herein, the most recent entry on the blockchain contains a copy of all of the subscriber's current personal information.

FIG. 7 is a data flow diagram of a process 700 of the subscriber 505 retrieving information from the blockchain 150 (shown in FIG. 1) using the privacy transaction management system 100 (shown in FIG. 1). In the exemplary embodiment, process 700 occurs the whenever the subscriber 505 views their data on the privacy transaction management system 100 and has one or more entries on the blockchain 530.

The subscriber 505 requests S705 to view their current information in the privacy transaction management system 100. In some embodiments, subscriber's information may be stored on the computer device 510. If the computer device 510 is lost or replaced, the privacy transaction management system 100 allows the subscriber 505 to query the blockchain 530 to retrieve subscriber's personal information. The computer device 510 generates S710 a request package including the subscriber's public key (Kab) and the personal information that is being requested. The computer device 510 signs S715 the request package with subscriber's private key (Kay). Signing S715 the request package allows the privacy transaction management system 100 to match the signature with the public key (Kab) that is on file to authenticate the subscriber 505. The computer device 510 transmits S720 the signed request package and the subscriber's public key (Kab) to the node portal 515. In some embodiments, the transmission is made using the TLS protocol. In some further embodiments, the transmission includes a nonce and is further encrypted with chain's public key (Kcb) to prevent replay attacks.

The node portal 515 transmits S725 the signed request package and the subscriber's public key (Kab) to the node processing 520. The node processing 520 verifies S730 the signature on the signed request package using the subscriber's public key (Kab). Then the node processing 520 queries S735 the blockchain 530 to find the most recent transaction associated with the subscriber's public key (Kab). If the node processing 520 determines S740 that the most recent transaction is a burn/forget or opt-out transaction, then process 700 terminates. Otherwise, the node processing 520 locates S745 the first entry associated with the subscriber 505 in the blockchain. The node processing 520 extracts S750 the encrypted chain key (K'ac) from the first entry using the subscriber's public key (Kab). The node processing 520 decrypts S755 the encrypted chain key (K'ac) using the chain's private key (Kcv) to retrieve the subscriber's chain key (Kac). The node processing 520 decrypts S760 the subscriber's personal information using the subscriber's chain key (Kac). The node processing 520 generates S765 a response package. The node processing 520 encrypts S770 the response package with the subscriber's public key (Kab) and the chain's public key (Kcb).

The node processing 520 transmits S775 the encrypted response package to the node portal 515. The node portal 515 forwards S780 the encrypted response to the computer device 510. The computer device 510 decrypts S785 the encrypted response using the subscriber's private key (Kay). The computer device 510 displays S790 the information that was retrieved from the blockchain 530 to the subscriber 505. The computer device 510 notifies S795 the subscriber 505 that they may begin the editing process as described in process 800 (shown in FIG. 8).

FIG. 8 is a data flow diagram of a process 800 of the subscriber 505 appending data to the blockchain 150 (shown in FIG. 1) using the privacy transaction management system 100 (shown in FIG. 1). In the exemplary embodiment, process 800 occurs when the subscriber 505 submits a change to their information in the privacy transaction management system 100 and has one or more entries on the blockchain 530. In the exemplary embodiment, process 800 occurs after process 700 has been used to retrieve data from the blockchain 530. In some embodiments, process 800 does not depend on process 700, such as in embodiments, where the subscriber's data that is stored on the blockchain 530 is also stored in the computer device 510.

In the exemplary embodiment, the subscriber 505 edits S805 the fields that they wish to update to the computer device 510. For example, the subscriber 505 may edit S805 some or all of the fields in the subscriber's personal information. The subscriber 505 commits S810 the edits. The computer device 510 generates S815 an update package including the updated personal information and the subscriber's public key (Kab). The subscriber's public key is required to locate the required records. In the exemplary embodiment, the updated personal information includes all of the subscriber's personal information, even if the subscriber is only updating one or two fields. The computer device 510 signs S820 the update package with the subscriber's private key (Kay). Signing S820 the request package allows the privacy transaction management system 100 to match the signature with the public key (Kab) that is on file to authenticate the subscriber 505. The computer device 510 transmits S825 the signed update package and the subscriber's public key (Kab) to the node portal 515. In some embodiments, the transmission is made using the TLS protocol. In some further embodiments, the transmission includes a nonce and is further encrypted with chain's public key (Kcb) to prevent replay attacks.

The node portal 515 forwards S830 the signed update package and the subscriber's public key (Kab) to the node processing 520. The node processing 520 verifies S835 the signature on the signed request package using the subscriber's public key (Kab). Then the node processing 520 queries S840 the blockchain 530 to find the most recent transaction associated with the subscriber's public key (Kab). If the node processing 520 determines S845 that the most recent transaction is a burn/forget or opt-out transaction, then process 800 terminates. Otherwise, the node processing 520 locates S850 the first entry associated with the subscriber 505 in the blockchain. The node processing 520 extracts S855 the key from the first entry using the subscriber's public key (Kab). The node processing 520 decrypts S860 the encrypted chain key (K'ac) using the chain's private key (Kcv) to retrieve the subscriber's chain key (Kac). The node processing 520 decrypts S865 the update package using the subscriber's public key (Kab) to retrieve the updated personal information.

The node processing 520 transmits S870 the updated personal information and the subscriber's key chain (Kac) to the node TPM 525. The node TPM 525 encrypts S875 the updated personal information using the subscriber's chain key (Kac). The node TPM 525 transmits S880 the re-encrypted updated personal information to the node processing 520. The node processing 520 submits S885 the encrypted updated personal information and the subscriber's public key (Kab) to be stored on the blockchain 530. In the exemplary embodiment, each entry associated with the subscriber 505 is encrypted with the subscriber's key chain (Kac), which is unique to the subscriber 505, and the subscriber's public key (Kab).

The computer device 510 notifies S890 the subscriber 505 when the update process 800 is complete.

In the exemplary embodiment, part of maintaining the database of consumer information includes the ability for the consumer or subscriber to remove themselves from the having their information be available to others, also known as the right to be forgotten. As described herein, there are several approaches to removing access to the consumer's information. While the information on the blockchain may not be removed, the privacy transaction management system 100 may prevent others, such as advertisers, from having access to the personal information of the consumer when the consumer has opted-out.

The first method is a signed burn. If the subscriber 505 still has access to their private key (Kay), such as through their computer device 510, the subscriber 505 may use the append process 800 to issue a new transaction to the blockchain 530. This new transaction ends the ability for any future transactions to use the genesis process 600, the retrieve process 700, or the append process 800 against the subscriber's public key (Kab). The smart contract 440 and the secure execution environment 400 (both shown in FIG. 4) enforce these permissions.

In some situations, the signed burn method is unavailable, such as when the subscriber 505 is no longer in possession of their private key (Kay), aka if they lost computer device 510. One method to handle this situation is a second factor verified burn approach. In this method, the subscriber 505 indicates their intention to burn their identity associated with certain pieces of information, such as name and phone number. These pieces of information are required to uniquely identify the subscriber. The smart contract 440 and the secure execution environment 400 would issue a burn transaction on behalf of the subscriber 505.

A third method would be a visual verification burn. This method adds another step to the initial registration process 600. When the subscriber 505 submits S610 the registration information, the registration information includes a thumbnail of the image that was used to generate S555 the subscriber's private key (Kay). When the first transaction for the subscriber 505 on the blockchain 530 is generated, the system 100 includes an encrypted value of the thumbnail which may be used as an identifier. When the subscriber 505 requests a burn transaction, the subscriber 505 is given a verification challenge to select the thumbnail that they used to register from among a line-up of thumbnails. If the selection is correct, the smart contract 440 and the secure execution environment 400 would issue a burn transaction on behalf of the subscriber 505. If the selection is incorrect, a new thumbnail burn transaction is issued which lists that the incorrectly selected thumbnail identifier in the subscriber's first transaction can no longer be selected, an amount of time before another visual verification burn may be attempted, and the current visual verification wait duration (in seconds). For example, the first wait duration may be 30 seconds, and each subsequent attempt doubles this wait period.

The computer-implemented methods discussed herein may include additional, less, or alternate actions, including those discussed elsewhere herein. The methods may be implemented via one or more local or remote processors, transceivers, and/or sensors (such as processors, transceivers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

The exemplary embodiments provided herein describe a privacy transaction management system that is advantageously disposed to manage and monitor consumer privacy information and preferences. The privacy transaction management system thus functions as a midbox capable of: (i) securely storing consumer privacy transactions; (ii) providing a central repository for such consumer information; (iii) releasing consumer information based on the consumer's opt-in/out decisions; and (iv) allowing the consumer to securely opt-out of information disclosure.

The aspects described herein may be implemented as part of one or more computer components such as a client device and/or one or more back-end components, such as a blockchain nods, for example. Furthermore, the aspects described herein may be implemented as part of a computer network architecture and/or a cognitive computing architecture that facilitates securely storing and selectively releasing consumer information. Thus, the aspects described herein address and solve issues of a technical nature that are necessarily rooted in computer technology.

For instance, aspects include managing a centralized blockchain of consumer privacy information and decisions. In doing so, the aspects overcome issues associated with having multiple lists of decisions stored at multiple locations and requiring consumers to individually opt-in and out of offers. Furthermore, these aspects reduce the chance of data compromise. Without the improvements suggested herein, additional processing and memory usage, or even direct human intervention, would be required to perform such activities. Additional technical advantages include, but are not limited to: i) improved speed and responsiveness in communication with a connected device; ii) ensuring privacy of information is secured; iii) ensuring only those authorized are able to access information that has been authorized for release; iv) reducing required consumer interaction; v) automatically preventing access to information based on user choice; and vi) allowing for permanent records of transactions. Additional technical advantages are described in other sections of the specification.

Furthermore, the embodiments described herein improve upon existing technologies, and improve the functionality of computers, by more accurately storing the latest consumer personal information and decisions. The present embodiments improve the speed, efficiency, security, and storage space required in which such methods may be performed. Due to these improvements, the aspects address computer-related issues regarding efficiency over conventional techniques. Thus, the aspects also address computer related issues that are related to the privacy of consumer information, for example.

Accordingly, the innovative systems and methods described herein are of particular value within the realm of consumer privacy, which have been historically associated with a poor record of securing personal information and are designed to comply with new regulations. The present embodiments enable more reliable updating and control of such information, but without compromising data and security. Furthermore, according to the disclosed techniques, advertisers are better able to ensure that those that they transmit advertisements to are those that have requested them. Moreover, the ability to more reliably track consumers, but without adding additional risk to consumer data, greatly enhances the ability of advertisers and consumers to be able to communicate.

Exemplary embodiments of systems and methods for securing consumer information are described above in detail. The systems and methods of this disclosure though, are not limited to only the specific embodiments described herein, but rather, the components and/or steps of their implementation may be utilized independently and separately from other components and/or steps described herein.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A privacy transaction management system for securely storing information of a subscriber, comprising:
   a digital ledger having a distributed database configured to store the subscriber information as a plurality of database entries;
   at least one node including a ledger processor in operable communication with the digital ledger, and a trusted platform module (TPM) and a secure execution environment (SEE) in operable communication with the ledger processor,
   wherein digital ledger and the ledger processor are separate from and different from the TPM and the SEE,
   wherein the SEE includes a memory device and a processing device,
   wherein the ledger processor is configured to (i) generate a subscriber ledger key $K_{ac}$ unique to the subscriber, based on a public encryption key $K_{ab}$ of the subscriber, (ii) communicate with the TPM to encrypt the subscriber ledger key $K_{ac}$ with a private key $K_{cv}$ of the digital ledger to create a ledger encryption key $K'_{ac}$, (iii) store the ledger encryption key $K'_{ac}$ as a first entry of the plurality of database entries, (iv) encrypt the subscriber information with the ledger encryption key $K'_{ac}$, and (v) store the encrypted subscriber information in the distributed database as one or more additional entries of the plurality of database entries,
   wherein the ledger processor comprises an indexer configured to index the plurality of database entries based on the public encryption key $K_{ab}$ of the subscriber.

2. The system of claim 1, wherein the digital ledger comprises a blockchain ledger, and wherein the ledger processor is a blockchain processor.

3. The system of claim 2, wherein the blockchain processor is configured to generate the ledger encryption key $K'_{ac}$ and validate the public encryption key $K_{ab}$ of the subscriber using a public key infrastructure (PKI).

4. The system of claim 3, wherein the blockchain processor is configured to manage the plurality of database entries by one of (i) direct encoding, and (ii) assertion through an off-chain encryption device.

5. The system of claim 3, wherein the TPM comprises a key database and a trust store.

6. The system of claim 5, wherein the TPM resides within the SEE.

7. The system of claim 5, wherein the trust store is configured to store one or more PKI certificates capable of proving trust with one or more signing authorities.

8. The system of claim 7, wherein the one or more PKI certificates includes at least one PKI certificate of a different blockchain node authorized to communicate with the at least one node.

9. The system of claim 7, wherein the one or more signing authorities include a root certificate authority or a signing node authority.

10. The system of claim 2, wherein the processing device is configured to execute at least one of (i) a genesis process for adding the subscriber to the blockchain ledger, (ii) a retrieval process for retrieving data from the blockchain ledger, (iii) an appending process for updating the subscriber information in the blockchain ledger, and (iv) a burn process for preventing retrieval of the subscriber information from the blockchain ledger.

11. The system of claim 10, wherein the genesis process is configured to cause the blockchain processor to generate the ledger encryption key and store the ledger encryption key as the first entry of the plurality of database entries.

12. The system of claim 10, wherein the burn process is configured to set flags on the plurality of database entries to prevent dissemination of the subscriber information.

13. The system of claim 12, wherein the flags are configured to prevent dissemination of a first portion of the subscriber information, and to allow dissemination of a second portion of the subscriber information.

14. The system of claim 12, wherein the flags are configured to prevent dissemination of the subscriber information to a first party, and to allow dissemination of the subscriber information to a second party different from the first party.

15. The system of claim 12, wherein the flags are configured according to the indexing of the plurality of database entries by the blockchain processor.

16. The system of claim 10, wherein the memory device is configured to store executable instructions for one or more of the genesis process, the retrieval process, the appending process, and the burn process.

17. The system of claim 16, wherein the SEE further comprises a smart contract comprising a collection of signed logic for execution of the stored executable instructions in the memory device.

18. The system of claim 1, further comprising a node portal configured to route requests from an electronic device of the subscriber to the at least one node.

19. The system of claim 18, wherein the node portal includes at least one application programming interface.

20. A privacy transaction management method for securely storing information of a subscriber on a distributed ledger, the method performed by a node processor in operable communication with the distributed ledger and an electronic device of the subscriber, the method comprising the steps of:
  receiving a registration request from the electronic device of the subscriber, wherein the registration request includes the subscriber information and a public key $K_{ab}$ of the subscriber;
  generating a subscriber ledger key $K_{ac}$ unique to the subscriber, based on the public encryption key $K_{ab}$ of the subscriber;
  creating a ledger encryption key $K'_{ac}$ by encrypting the subscriber ledger key $K_{ac}$ with a private key $K_{cv}$ of the digital ledger;
  storing the ledger encryption key $K'_{ac}$ as a first subscriber entry on the distributed ledger;
  encrypting the subscriber information with the ledger encryption key $K'_{ac}$;
  storing the encrypted subscriber information as a second subscriber entry on the distributed ledger;
  indexing the first and second subscriber entries with an index, separate from the distributed ledger, based on the public encryption key $K_{ab}$ of the subscriber;
  determining a ledger decryption key for the ledger encryption key $K'_{ac}$ based on the private key $K_{cv}$ of the digital ledger; and
  locating the second subscriber entry within the distributed ledger using the index.

21. The method of claim 20, wherein the distributed ledger is a blockchain.

22. The method of claim 21, wherein the index includes every block on the blockchain where the subscriber is listed.

23. The method of claim 21, wherein the index includes a most recent block on the blockchain for a transaction including the subscriber.

24. The method of claim 20, further comprising the step of updating the index periodically.

25. A privacy management system for managing transaction information of a subscriber on a digital ledger, the digital ledger including a ledger database configured to store the subscriber transaction information as a plurality of subscriber database entries among data in the digital ledger, the privacy management system comprising:
  a processor in operable communication with the digital ledger and an electronic device of the subscriber, the processor configured to register the subscriber transaction information on the digital ledger; and
  a memory device including computer-executable instructions stored therein, which, when executed by the processor, cause the processor to:
    (i) generate a subscriber ledger key $K_{ac}$ unique to the subscriber based on the public encryption key $K_{ab}$ of the subscriber;
    (ii) obtain a ledger encryption key $K'_{ac}$ by encryption of the subscriber ledger key $K_{ac}$ with a private key $K_{cv}$ of the digital ledger;
    (iii) register the ledger encryption key $K'_{ac}$ on the digital ledger as a first entry of the plurality of subscriber database entries;
    (iv) encrypt all subsequent subscriber database entries, of the plurality of subscriber database entries on the digital ledger, with the first entry; and
    (v) set a flag on at least one subsequent entry of the subsequent subscriber database entries, the flag preventing the at least one subsequent entry from being presented to a third party having access to the digital ledger.

26. The system of claim 25, wherein the computer-executable instructions further cause the processor to append the subscriber to the digital ledger upon registration of the subscriber encryption key as the first entry.

27. The system of claim 25, wherein the computer-executable instructions further cause the processor to update one or more of the flag and the subscriber transaction information in the digital ledger based on information received from the electronic device of the subscriber.

28. The system of claim 25, wherein the computer-executable instructions further cause the processor to (i) monitor the data in the digital ledger, and (ii) create an index, within the memory device, for the plurality of subscriber database entries.

29. The system of claim 28, wherein the index is based on the first entry.

30. The system of claim 29, wherein the computer-executable instructions further cause the processor to retrieve the at least one subsequent entry using the index.

31. The system of claim 29, wherein the index lists each occurrence within the digital ledger data including a subscriber database entry.

32. The system of claim 29, wherein the index lists a most recent subscriber database entry of the plurality of subscriber database entries.

33. The system of claim 29, wherein the computer-executable instructions further cause the processor to update the index periodically.

34. The system of claim 25, wherein the flag prevents all of the subscriber database entries from being presented to all third party requestors of the digital ledger.

35. The system of claim 25, wherein the flag prevents all of the subscriber database entries from being presented to a selected third party requestor of the digital ledger.

36. The system of claim 25, wherein the flag is set for subscriber database entries containing location information.

37. A privacy transaction management system for securely storing information of a subscriber, comprising:
- a digital ledger having a distributed database configured to store the subscriber information as a plurality of database entries;
- at least one node including a ledger processor in operable communication with the digital ledger, and a trusted platform module (TPM) and a secure execution environment (SEE) in operable communication with the ledger processor,
- wherein digital ledger and the ledger processor are separate from and different from the TPM and the SEE,
- wherein the SEE includes a memory device and a processing device,
- wherein the ledger processor is configured to (i) generate a subscriber ledger key $K_{ac}$ unique to the subscriber, based on a public encryption key $K_{ab}$ of the subscriber, (ii) communicate with the TPM to encrypt the subscriber ledger key $K_{ac}$ with a private key $K_{cv}$ of the digital ledger to create a ledger encryption key $K'_{ac}$, (iii) store the ledger encryption key $K'_{ac}$ as a first entry of the plurality of database entries, (iv) encrypt the subscriber information with the ledger encryption key $K'_{ac}$, and (v) store the encrypted subscriber information in the distributed database as one or more additional entries of the plurality of database entries,
- wherein the ledger processor comprises an indexer configured to index the plurality of database entries based on the public encryption key $K_{ab}$ of the subscriber,
- wherein the digital ledger comprises a blockchain ledger, and wherein the ledger processor is a blockchain processor;
- wherein the processing device is configured to execute at least one of (i) a genesis process for adding the subscriber to the blockchain ledger, (ii) a retrieval process for retrieving data from the blockchain ledger, (iii) an appending process for updating the subscriber information in the blockchain ledger, and (iv) a burn process for preventing retrieval of the subscriber information from the blockchain ledger, and
- wherein execution of the burn process by the processing device issues a terminal transaction to the blockchain ledger that prevents all subsequent transactions using the genesis process, the retrieval process, or the appending process against the public key $K_{ab}$ of the subscriber.

* * * * *